United States Patent [19]

Anderson et al.

[11] 4,402,025

[45] Aug. 30, 1983

[54] SERVO READ/WRITE HEAD ARM ASSEMBLY FOR MAGNETIC DISK DRIVE

[75] Inventors: Kurt M. Anderson, Louisville; James Morehouse, Jamestown, both of Colo.

[73] Assignee: Storage Technology Corporation, Louisville, Colo.

[21] Appl. No.: 198,054

[22] Filed: Oct. 17, 1980

[51] Int. Cl.³ .......................... G11B 5/60; G11B 21/00
[52] U.S. Cl. ..................................... 360/98; 360/103; 360/104; 360/128
[58] Field of Search ................... 360/98, 99, 102–105, 360/128, 129, 75, 77, 78, 106

[56] References Cited

U.S. PATENT DOCUMENTS 3,975,771  8/1976  Lazzari ................................. 360/104
4,120,010 10/1978  Mitsuya et al. ................. 360/105 X
4,314,295  2/1982  Frandsen ........................ 360/104 X

*Primary Examiner*—John H. Wolff
*Attorney, Agent, or Firm*—Woodcock, Washburn, Kurtz, Mackiewicz & Norris

[57] ABSTRACT

A magnetic disk drive includes a stack of magnetic disks with servo tracks on a surface of a disk which is intermediate the extremes of the stack. A servo head arm assembly has three magnetic read/write heads and a servo head thereon. A multipart magnetic shield between the magnetic read/write heads and the servo head prevents electrical interference between the data signals and the servo signals.

6 Claims, 8 Drawing Figures

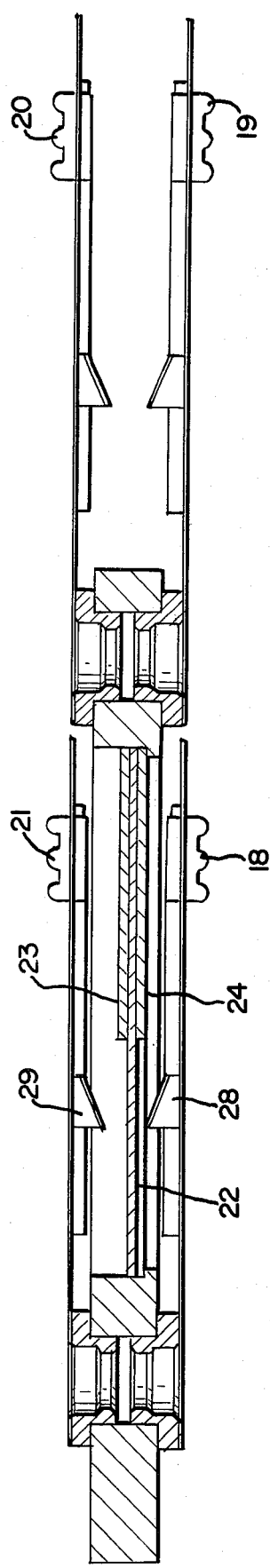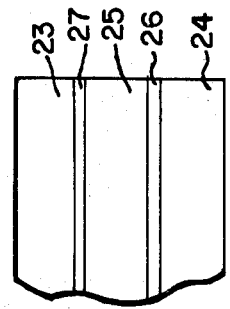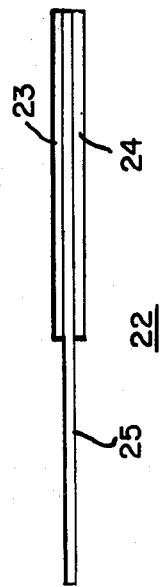

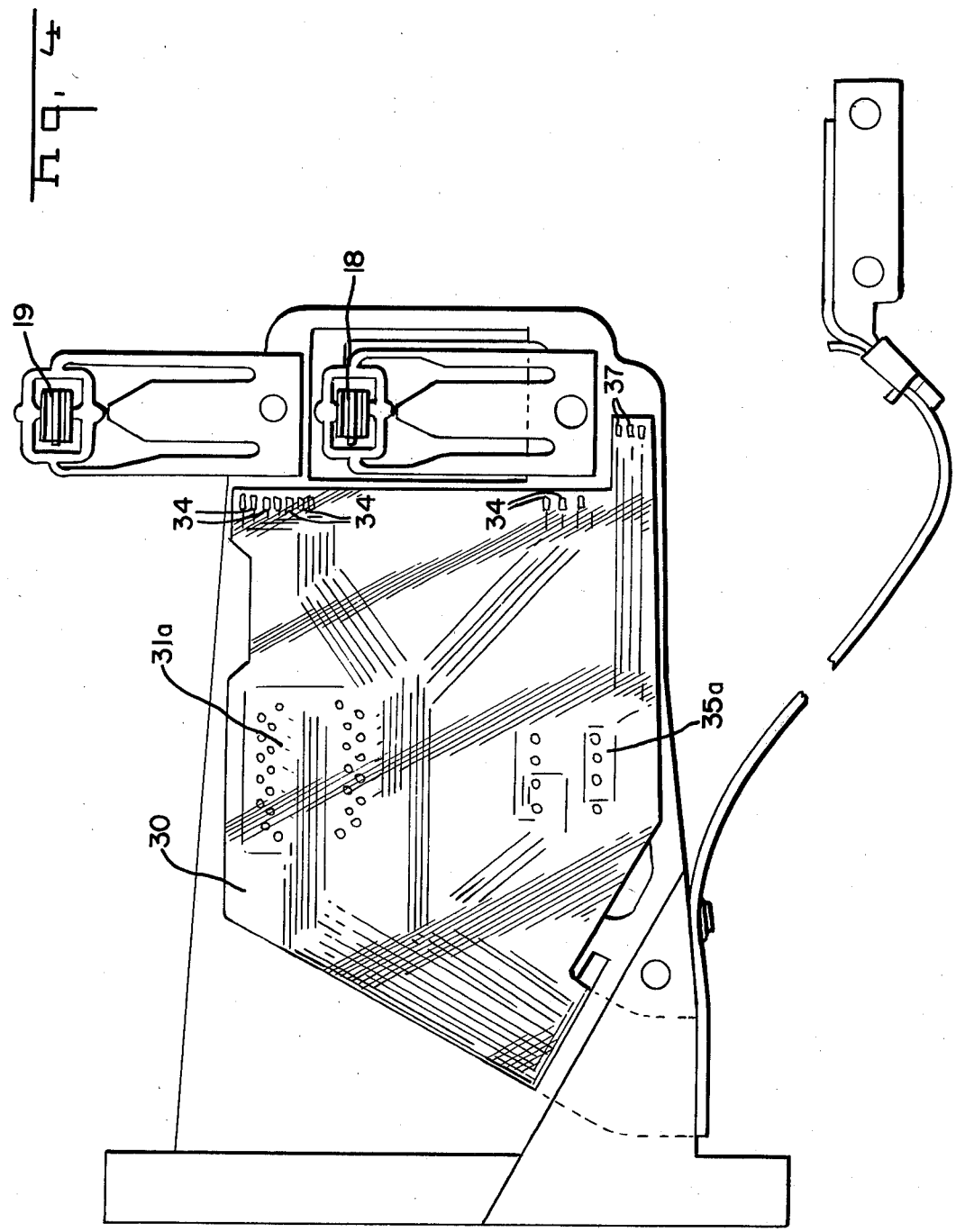

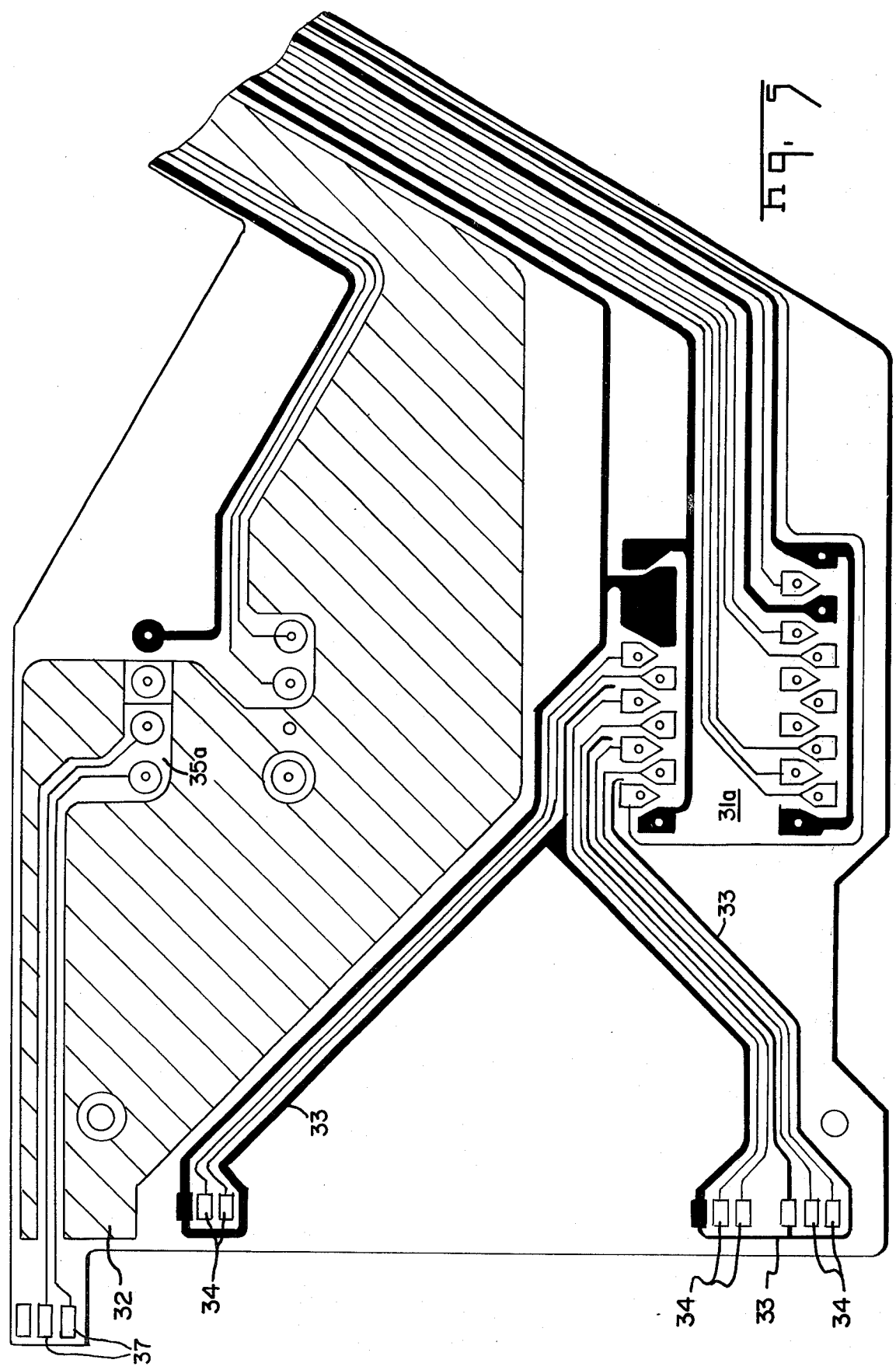

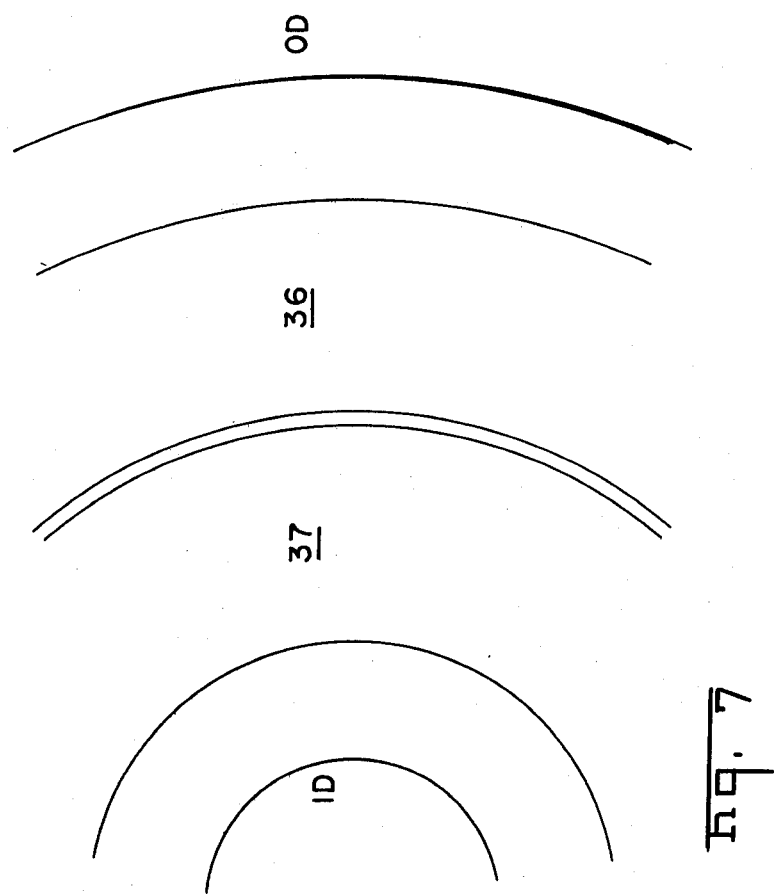

SERVO READ/WRITE HEAD ARM ASSEMBLY FOR MAGNETIC DISK DRIVE

BACKGROUND OF THE INVENTION

This invention relates to magnetic disk drives, and more particularly, to a head arm assembly having both servo and read/write heads thereon.

Magnetic disk units are extensively used in computer systems. Large magnetic disk units generally have a magnetic read/write assembly which is moved radially from track to track across a stack of magnetic disks. Examples of such drives are the IBM 3350 supplied by International Business Machines Corporation and STC 8350, supplied by Storage Technology Corporation. Recently, many small disk drives have been developed for minicomputer systems. An example of this type of drive is the IBM System 32 and comparable magnetic disk drives made by other companies. These disk drives usually make use of a magnetic head disk technology which is referred to as "IBM/Winchester".

High density magnetic disk drives have positional information recorded on one of the disks. A servo head reads this positional information to generate a servo signal which indicates the position of the read/write heads with respect to the magnetic disks in the stack.

In the prior art, the actuator for the magnetic head assemblies drives a plurality of read/write head arm assemblies having data read/write heads thereon, and one servo arm assembly having a single head thereon to generate the servo signal. The servo tracks are generally recorded on one of the extreme surfaces of the disk pack, for example on the bottom surface of the bottom disk in the pack. One reason for this arrangement is that it minimizes the interference between the data signals and the servo signals. However, the use of a dedicated arm assembly with a single servo head in this manner introduces other problems. If the axis of the stack of magnetic disks is tilted, an error is introduced between the track position indicated by the servo signal and the actual track position on disks other than the servo disk. When the servo track is on one of the extreme surfaces of the stack, this error is maximized on the disk surface at the other extreme of the stack. It would be more desirable to have the servo track intermediate the extremes of the stack. In this way, the off track error caused by tilt would be shared by the read/write heads on both sides of the stack from the servo disk. Also, the thermal environment experienced by the servo head would be more representative of the data heads and thus reduce arm related thermal distortion response. However, this is not feasible with a dedicated servo arm assembly with a single servo head as in the prior art. The use of such a dedicated servo arm in the middle of the stack would waste disk surface. The surface opposite and adjacent to the servo surface would not have read/write heads engaging it. Alternatively, an extra read/write head arm assembly would have to be provided for this otherwise unused surface.

It is an object of the present invention to provide a head arm assembly which minimizes interference between data and servo signals, which is positioned between the extremes of the disk stack, and which has both servo and read/write heads thereon, so that reading and writing can be accomplished efficiently from all disk surfaces.

SUMMARY OF THE INVENTION

In accordance with this invention, a servo head arm assembly for a magnetic disk drive has a plurality of read/write heads and a servo head mounted thereon. A multiple part magnetic shield on the servo head arm assembly prevents interference between data signals and servo signals. This head arm assembly is mounted between the extremes of the stack of disks. The read/write heads thereon engage surfaces of the disks reserved for data signals. The servo head engages a portion of a disk surface having servo signals recorded thereon.

In accordance with the present invention, the top of the top disk and the bottom of the bottom disk, are not used. This is important for several reasons. First, since the R/W and servo R/W arm geometry are the same, any thermal distortions are essentially the same on the two arms. Second, the thermal gradients and airflow on the surfaces that are not used are vastly different than the conditions that exist between the disks. This causes distortion and off-track error if the servo arm is on one of these extreme surfaces. Third, special arms that only have two heads that fly on these extreme surfaces are not required. Also, since the extreme surfaces are the most easily damaged surfaces during assembly, a better yield can be obtained because such damaged units can be accepted for use with only a loss in data capacity. The crucial servo capability is not impaired.

Further in accordance with the present invention, the flat multiple part magnetic shield of this invention is particularly suitable for use with magnetic heads of the lightly loaded type referred to as "Winchester" heads.

Further in accordance with the present invention, the flex circuit which is mounted on the servo head arm assembly to process data and servo signals has shielding between the data and servo circuitry for minimizing interference. The flex circuit is mounted on the opposite side of the servo head arm assembly from the servo head to further prevent this interference.

The foregoing objects, features and advantages of the invention will be better understood from the following more detailed description and appended claims.

SHORT DESCRIPTION OF THE DRAWINGS

FIG. 3 is a section on the line 3—3 of FIG. 2 (rotated 90° counter-clockwise);

FIG. 4 is a view of the bottom of the servo arm assembly;

FIG. 5 shows the flex circuit in more detail;

FIGS. 6 and 6A show the shield in more detail; and

FIG. 7 shows the arrangement of the data and servo tracks on the disk.

DESCRIPTION OF THE PREFERRED EMBODIMENT

Figure 1:
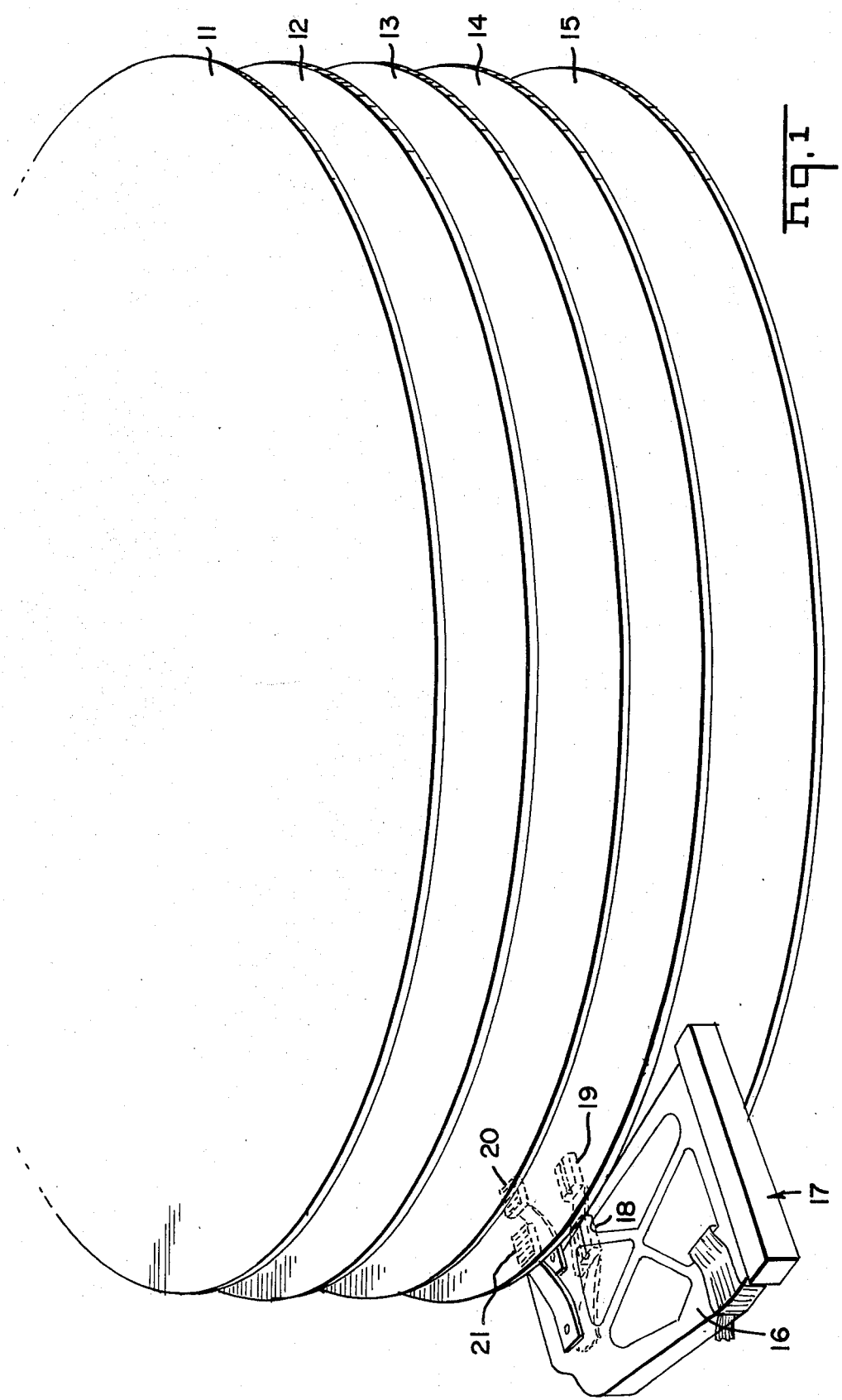
FIG. 1 is a perspective view of the disks and the servo arm assembly.
Figure 2:
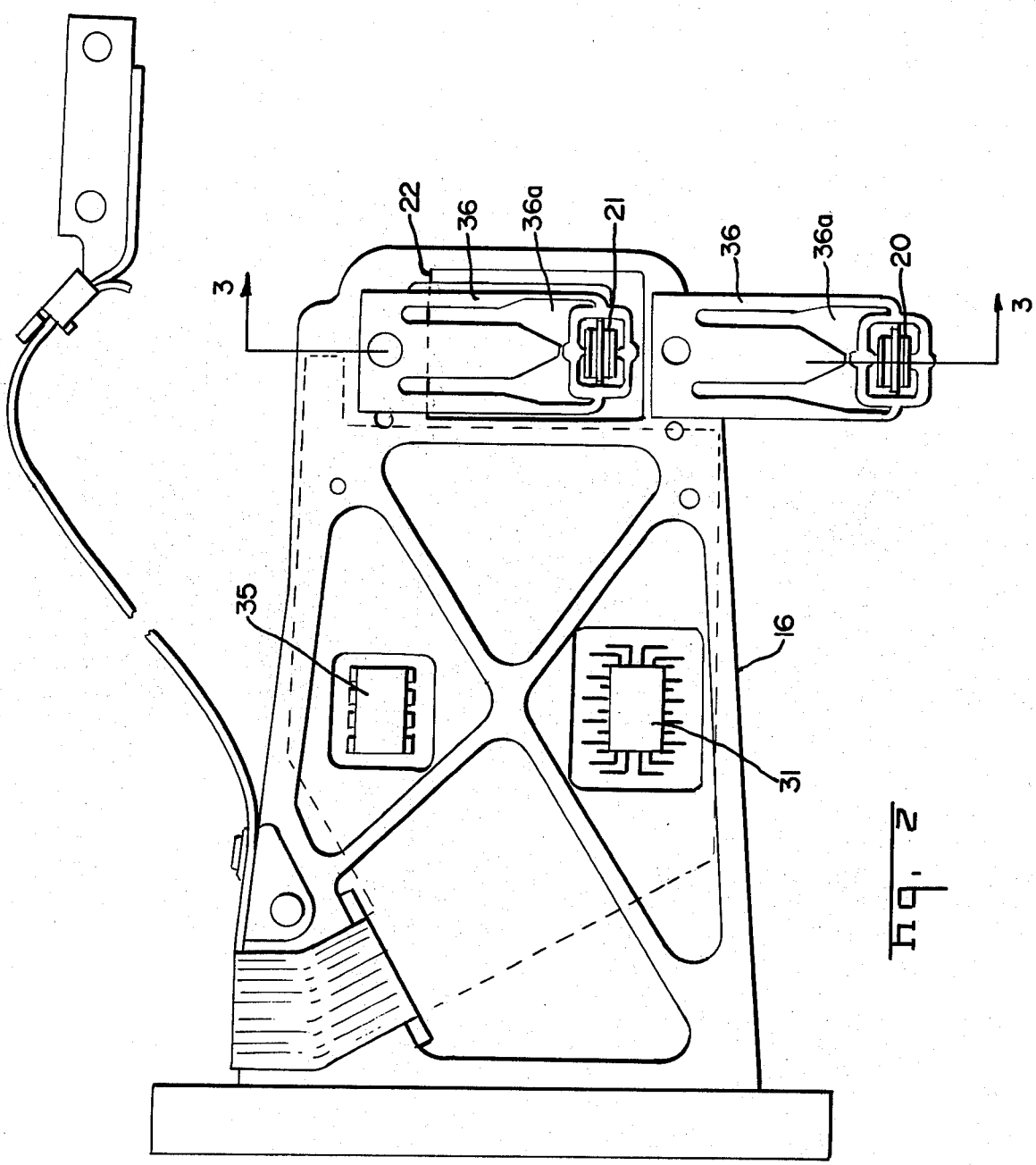
FIG. 2 is a view of the top of the servo arm assembly.

Referring to FIG. 1, a stack of magnetic disks 11–15 rotate on a common hub. A servo head arm assembly 16 is driven by an actuator 17. The actuator is described in U.S. Pat. No. 4,331,991—Morehouse, et al; Morehouse and Swenson the disclosure of which is incorporated herein by reference. The servo head arm assembly 16 has magnetic read/write heads 18–20 and a servo head 21 mounted thereon. Servo head 21 reads a servo signal recorded on the servo tracks on the lower surface of magnetic disk 14. Data read/write head 20 records and reads data signals on this disk while data read/write heads 18 and 19 read and write data signals on the upper surface of disk 15. Data heads 18–20 and servo head 21 are of the Winchester type. These magnetic heads are mounted on thin, flat sheetmetal suspensions 36 having cutout portions 36a (FIG. 2) to optimize the light loading of the head to the disk. In some prior art magnetic heads, such as Control Data Corporation's Storage Module Drive, it is possible to place a shielding box around the transducer portion of the head to prevent electrical interference. However, with heads of the monolithic Winchester type, it is not possible to provide a shielding box for the transducers.

In the prior art disk drives comparable to the IBM System 32, a dedicated servo arm assembly reads a servo track on the bottom surface of the bottom disk 15 and the remaining disk surfaces record data signals. This provides good separation between the servo signal and data signals to minimize interference. However, any tilt in the axis of the stack produces an off-track position error which is a maximum for the top disk 11. Also, the substantially altered airflow above and below the disk stack, relative to the inter-disk airflow, thus produces a substantially altered thermal environment for the servo arm.

In accordance with the present invention, the off-track error caused by tilt is shared between the disk 15 and the disks 11–13. Putting the servo head on an inter-disk arm with the same geometry as a data arm results in reduced positioning error due to the equivalent distortions in both servo and data arms (brought on by radial thermal gradients and the actuation of the arms across these gradients) which mutually cancel out the distortions.

We have found that in one actual disk drive the present invention provides an improvement in offtrack error of approximately 25%.

In accordance with this invention, a multi-part magnetic shield 22 on the arm assembly between the data read/write heads and the servo head prevents interference between data signals and position signals. The magnetic shield 22 is shown in FIGS. 2, 3, 6 and 6A. The shield includes two short pieces of ferrite 23 and 24 and a long piece of ferrite 25. The ferrite piece 25 has layers of copper 26 and 27 thereon. (FIG. 6A) We have found that by making the shield of multiple layers of ferrite and copper as shown, effective shielding is provided between the data signals and the servo signals. The ferrite pieces 23 and 24 are made shorter than the center ferrite piece to accommodate the load/unload mechanisms 28 and 29 on the head assembly.

In order to process data and servo signals, a flex circuit 30 (FIG. 4) is mounted on the servo head arm assembly 16. Flex circuit 30 has shielding between the servo circuitry and the read/write circuitry. The read/write circuitry includes an LSI (Large Scale Integration) chip 31 which extends through a hole in the head arm assembly so that it can be seen from the top in FIG. 2 and from the bottom in FIG. 4. The locations of the chip 31 and the traces leading into it provide shielding of the data signal from the servo signal. As shown in FIG. 5, a ground plane 32 extends between the traces 34 carrying data and the traces 37 carrying servo signals. Shielding traces 33 extend around the read/write circuitry traces 34. A servo preamp 35 (the connections to which are shown at 31a and 35a) processes the servo signals. Chips 31 and 35 are well shielded from one another in the layout shown in FIG. 5.

In order to further shield the data signals from the signals, the servo flex circuit 30 is positioned on the opposite side of the arm assembly 16 from the servo head 21 so that interference emitted by the flex circuit 30 must pass through the shield 22 before reaching the servo head 21.

FIG. 7 shows the arrangement of the data and servo tracks on the bottom side of the disk 14. Servo tracks are arranged in the portion 36 of the disk surface which is toward the periphery of the disk while data is arranged in tracks in the portion 37 of the disk surface which is inboard.

While a particular embodiment of the invention has been shown and described, various modifications are within the true spirit and scope of the invention. The appended claims are, therefore, intended to cover all such modifications.

We claim:

1. A magnetic disk drive comprising:
   a plurality of rotating magnetic disks in a stack for storing data signals on tracks thereof, one of said disks having a group of servo tracks having position signals recorded thereon;
   a plurality of data read/write head arm assemblies having data read/write heads positioned thereon in operative relation to tracks on opposing surfaces of two of said disks;
   an actuator for driving said data read/write heads on said assemblies into data writing or reading relationship with said tracks;
   a servo head arm assembly driven by said actuator, said servo head arm assembly having a data read/writ head and a servo head for reading said position signals positioned in operative relation to tracks on opposing surfaces of two of said disks; and
   a multi-part magnetic shield on said servo head arm assembly between said last named data read/write head and said servo head to prevent interference between said data signals and said position signals.

2. The magnetic disk drive recited in claim 1 wherein said servo tracks are on a magnetic disk between the extremes of said stack so that error in read/write head track position, caused by tilt of said stack and uncorrectable by said position signals, is shared by read/write heads both above and below the disk having said servo tracks.

3. The magnetic disk drive recited in claim 1 wherein said heads are mounted on thin flat sheet metal suspensions having cut-out portions to optimize the interface between said heads and said disks.

4. The magnetic disk drive recited in claim 1 and a flex circuit mounted on said servo head arm assembly having read/write circuitry for processing said data signals and servo circuitry for processing said servo signals, said flex circuitry having shielding between said servo circuitry and said read/write circuitry to prevent interference between said data signals and said servo signals.

5. The magnetic disk drive recited in claim 4 wherein said flex circuit is on the opposite side of said servo head arm assembly from said servo head to further prevent said interference.

6. The magnetic disk drive recited in claim 1 wherein said shield includes three flat ferrite pieces and two copper pieces interposed between said ferrite pieces in a stack.

* * * * *